(12) United States Patent
Hattori et al.

(10) Patent No.: US 7,734,396 B2
(45) Date of Patent: Jun. 8, 2010

(54) DRIVING POSITION ADJUSTING SYSTEM

(75) Inventors: Toshihiro Hattori, Okazaki (JP);
Mitsuyasu Matsuura, Chiryu (JP);
Hirotane Ikeda, Nagoya (JP)

(73) Assignees: DENSO CORPORATION, Kariya (JP);
Nippon Soken, Inc., Nishio (JP)

( * ) Notice: Subject to any disclaimer, the term of this patent is extended or adjusted under 35 U.S.C. 154(b) by 432 days.

(21) Appl. No.: 11/902,213

(22) Filed: Sep. 20, 2007

(65) Prior Publication Data

US 2008/0077298 A1 Mar. 27, 2008

(30) Foreign Application Priority Data

Sep. 22, 2006 (JP) ............................. 2006-257903

(51) Int. Cl.
*G06F 7/00* (2006.01)
(52) U.S. Cl. ........................................ 701/49; 180/326
(58) Field of Classification Search ................. 180/326, 180/289; 701/49
See application file for complete search history.

(56) References Cited

U.S. PATENT DOCUMENTS

| 5,822,707 | A | * | 10/1998 | Breed et al. .................... 701/49 |
| 6,830,123 | B2 | | 12/2004 | Ohki et al. |
| 2007/0021893 | A1 | | 1/2007 | Ikeda et al. |
| 2007/0055413 | A1 | * | 3/2007 | McCullough et al. .......... 701/1 |
| 2007/0119647 | A1 | * | 5/2007 | Kusunoki ................... 180/326 |

FOREIGN PATENT DOCUMENTS

| JP | A-57-134349 | 8/1982 |
| JP | A-62-128850 | 6/1987 |
| JP | A-05-262173 | 10/1993 |
| JP | A-07-069107 | 3/1995 |
| JP | A-07-304358 | 11/1995 |
| JP | A-09-076840 | 3/1997 |
| JP | A-09-123924 | 5/1997 |
| JP | A-2002-120670 | 4/2002 |
| JP | A-2005-022599 | 1/2005 |
| JP | A-2005-254986 | 9/2005 |
| JP | A-2006-015872 | 1/2006 |
| JP | A-2006-123640 | 5/2006 |

* cited by examiner

*Primary Examiner*—Mark Hellner
(74) *Attorney, Agent, or Firm*—Posz Law Group, PLC

(57) ABSTRACT

A driving position adjusting system automatically adjusts a driving position in a second vehicle appropriately to a target user based on a driving position in a first vehicle adjusted by the target user. The driving position adjusting system includes a storage device, a detection device, an estimation device, a transmission device, and a control device. The storage device stores statistic data. The detection device detects a selected one of a plurality of divided range segments of the driving position in the first vehicle, the selected one being selected by the target user. The estimation device estimates an optimum one of the plurality of divided range segments in the second vehicle based on the statistic data and the selected one. The transmission device transmits to the second vehicle the optimum one in the second vehicle. The control device controls the driving position in the second vehicle correspondingly to the optimum one.

14 Claims, 4 Drawing Sheets

DRIVING POSITION ADJUSTING SYSTEM

CROSS REFERENCE TO RELATED APPLICATION

This application is based on and incorporates herein by reference Japanese Patent Application No. 2006-257903 filed on Sep. 22, 2006.

BACKGROUND OF THE INVENTION

1. Field of the Invention

The present invention relates to a driving position adjusting system for automatically adjusting a driving position in a second vehicle different in a vehicle model from a first vehicle, in which a target user rides, based on an adjustment result of a driving position in the first vehicle such that the adjusted driving position in the second vehicle is appropriate to the target user.

2. Description of Related Art

For example, Japanese Unexamined Patent Publication No. 2005-22599 discloses a device adjusting system for adjusting a device (e.g., a seat), which is adjustable according to the physical features of a user, to fit the physical features of the user for any models (types) of vehicles.

The device adjusting system comprises a data center, which converts the set positions and angles of devices (e.g., a steering, a seat, individual mirrors) transmitted from a vehicle to coordinate data on three-dimensional coordinate axes using the position of an accelerator pedal as a reference point based on the structure information of the vehicle model (type), and which stores the coordinate data in a memory. When the settings of the above-mentioned devices in a vehicle of a different type are to be changed, coordinate data on the set positions and angles of the above-mentioned devices included in the structure information of the different type of a vehicle is retrieved, set positions and angles of corresponding coordinate data having the highest degree of correspondence to the above coordinate data stored in the memory are determined, and the determined set positions and angles are transmitted from the data center to the vehicle of the different type.

However, vehicles of different types have, for example, different configurations of a seat (e.g., the height of a seat surface, the thickness of a cushion, the width and height of a back rest, and the like) in most cases. As a result, the settings adjusted by the process as described above might not necessarily give a sense of a perfect fit to a user. For example, in the adjusting process, even when the set positions and angles of devices (e.g., a steering, a seat, individual mirrors) in a certain vehicle are indicated by coordinate data on three-dimensional coordinate axes using the position of an accelerator pedal as the reference point and the set positions and angles of the corresponding coordinate data having the highest degree of correspondence to the coordinate data are determined in the different vehicle to perform the adjustment of the set positions and angles of the above devices.

SUMMARY OF THE INVENTION

The present invention is made in view of the above disadvantages. Thus, it is an objective of the present invention to address at least one of the above disadvantages.

To achieve the objective of the present invention, there is provided a driving position adjusting system, which automatically adjusts a driving position in a second vehicle appropriately to a target user based on an adjustment result of a driving position in a first vehicle adjusted by the target user, who rides in the first vehicle, the second vehicle being different in a vehicle model from the first vehicle. The driving position adjusting system includes a storage device, a detection device, an estimation device, a transmission device, and a control device. The storage device stores statistic data that indicates a ratio of users, who select one of a plurality of divided range segments of an adjustable range of the driving position in the second vehicle, and who select one of a plurality of divided range segments of an adjustable range of the driving position in the first vehicle, relative to users, who select the one of the plurality of divided range segments of the adjustable range of the driving position in the second vehicle. Here, the ratio is one of ratios respectively given to the plurality of divided range segments of the driving position in the first vehicle in association with each of the plurality of divided range segments of the driving position in the second vehicle. The detection device detects a selected one of the plurality of divided range segments of the driving position in the first vehicle, and the selected one is selected by the target user when the target user rides in the first vehicle. The estimation device estimates an optimum one of the plurality of divided range segments of the driving position in the second vehicle based on the statistic data stored in the storage device and based on the selected one of the plurality of divided range segments detected by the detection device. The optimum one of the plurality of divided range segments has a highest probability of being appropriate to the target user. The transmission device transmits to the second vehicle the optimum one of the plurality of divided range segments of the driving position in the second vehicle estimated by the estimation device. The control device controls the driving position in the second vehicle correspondingly to the optimum one of the plurality of divided range segments transmitted by the transmission device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENT

Figure 1:
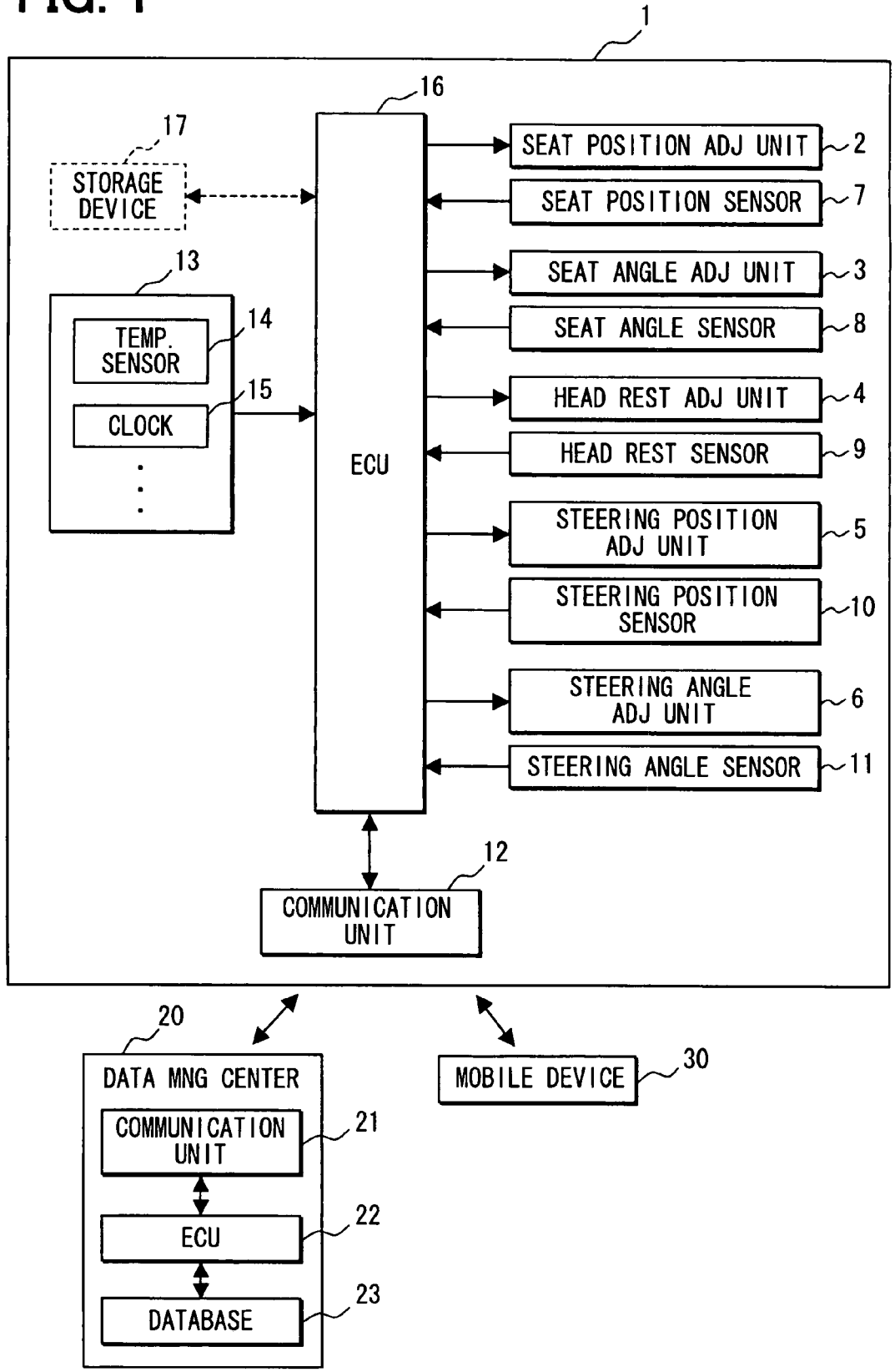
FIG. 1 is a block diagram showing an entire structure of a driving position adjusting system according to an embodiment of the present invention.

Referring now to the drawings, an embodiment of the present invention will be described herein below. FIG. 1 is block diagram showing the entire structure of a driving position adjusting system according to the present embodiment. As shown in FIG. 1, the driving position adjusting system according to the present embodiment mainly comprises a vehicle 1, a data management center 20, and a mobile device 30 carried (held) by the user of the vehicle 1.

The vehicle 1 has various units for adjusting the driving position of a driver (e.g., a user of the vehicle 1). Specifically, a seat position adjustment unit 2 for adjusting a position of a driver's seat (not shown), a seat angle adjustment unit 3, and a head rest adjustment unit 4 are provided. In addition, a steering position adjustment unit 5 and a steering angle adjustment unit 6, each for adjusting a position of a steering wheel (not shown), are provided. For example, in the present embodiment of the present invention, the driving position in the vehicle corresponds to a position (angle) of an assembly (e.g., a movable portion of the driver's seat, a mirror, a steering wheel) correspondingly to a posture and a position of the driver in the vehicle.

Typically, the seat position adjustment unit 2 adjusts a fore-and-aft position of the driver's seat by using a power source such as a motor in response to a switch operation by the user. The seat angle adjustment unit 3 adjusts a reclining angle of the back rest (seat back) of the driver's seat in response to a switch operation by the user, similar to the seat position adjustment unit 2. The head rest adjustment unit 4 adjusts the height of the head rest of the driver's seat.

The adjustment of the driver's seat is not limited to the examples shown above. Also, the vehicle 1 may have a seat surface position adjustment unit for adjusting a vertical position of a seat surface, a seat surface forward portion adjustment unit for adjusting the vertical position of the forward portion of the seat surface, a lumber support adjustment unit for adjusting the position of a lumber support provided at the back rest. It is also possible to combine any of these adjustment units and perform seat adjustment.

The steering position adjustment unit 5 adjusts the fore-and-aft position of the steering wheel by using a motor or the like as a power source in response to an operation by the user. The steering angle adjustment unit 6 adjusts the tilt angle of the steering wheel. By thus adjusting the fore-and-aft position and tilt angle of the steering wheel, the driver of the vehicle can obtain an appropriate driving position.

For example, in order to detect an optimum driving position, which has been set by the driver as the user, various sensors are provided in the vehicle 1. Specifically, in order to sense settings associated with the driver's seat, a seat position sensor 7 for sensing the fore-and-aft position of the driver's seat, a seat angle sensor 8 for sensing the reclining angle of the back rest of the driver's seat, and a head rest sensor 9 for sensing the height of the heat rest are provided. in order to sense settings associated with the steering wheel, a steering position sensor 10 for sensing the fore-and-aft position of the steering wheel and a steering angle sensor 11 for sensing the tilt angle of the steering are further provided.

A communication unit 12 transmits various data outputted from an electric control unit (ECU) 16, which will be described later, to the data management center 20. The communication unit 12 also outputs various data transmitted from data management center 20 to the ECU 16. The communication unit 12 further has a short distance wireless communication function, e.g., Bluetooth®, to communicate with the mobile device 30 (e.g., a cellular phone, an IC card) carried by the user.

The communication unit 12 also stores user ID information (identity information) for identifying the user, vehicle type information indicating the type (model) of the vehicle 1, and the like. On transmitting the various data outputted from the ECU 16 to the data management center 20, the communication unit 12 transmits the user ID information and the vehicle type information together therewith. When the vehicle 1 is used by a plurality of users, the users may register in advance their respective user IDs in the communication unit 12, such that one user, who actually uses the vehicle 1, selects the user ID of his or her own for use by the communication unit 12. Alternatively, the user ID information of the user may be stored in the mobile device 30 carried by each of the users such that the communication unit 12 can obtain the user ID information through communication with the mobile device 30.

When a command for adjusting the driving position is given by the user, the ECU 16 outputs a control signal in response to the command by the user to each of the adjustment units 2 to 6. As a result, desired adjustment of the driving position desired by the user is performed. Also, for example, in a case, where the ECU 16 receives information indicating an optimum driving position of a particular target user from the data management center 20, the ECU 16 outputs a control signal to each of the adjustment units 2 to 6 in accordance with the optimum driving position information. Furthermore, in another case, where the adjustment of the driving position has been performed by the user, the ECU 16 causes the various sensors 7 to 11 to sense the adjusted positions and angles, and transmits the sensing results to the data management center 20 via the communication unit 12.

The vehicle 1 also comprises a sensor assembly 13 (driving environment detection device) for sensing the driving environment of the vehicle 1. The sensor assembly 13 includes a temperature sensor 14 for sensing temperatures inside and outside the vehicle 1 and an internal clock 15 for calculating hours, during which the vehicle 1 is driven, and a driving duration.

The data management center 20 estimates the optimum driving position for the target user in a second vehicle different in a vehicle model from the first vehicle based on the adjustment result of the driving position in the vehicle 1 (first vehicle) adjusted by the target user. Here, the target user rides in the vehicle 1 in the adjustment of the driving position. Also, the data management center 20 transmits information indicating the estimated optimum driving position to the second vehicle. More specifically, the data management center 20 divides the adjustable range of the driving position in each of the first vehicle and the second vehicle into a plurality of divided range segments. Then, the data management center 20 estimates an optimum divided range segment of the driving position (i.e., an optimum one of the of the plurality of divided range segments of the adjustable range of the driving position) in the second vehicle based on the divided range segment of the driving position selected in the first vehicle. The estimated divided range segment serves as the optimum driving position information transmitted to the second vehicle.

The data management center 20 comprises a communication unit 21 for communicating with the vehicle 1 and an ECU 22 for performing the estimation of the optimum driving position in the second vehicle based on the result of the adjustment of the driving position in the first vehicle and for performing other arithmetic processes. The data management center 20 further comprises a database 23 (e.g., data storage device 23 that has a data base) storing therein statistic data indicating the relationship between respective driving positions in the first vehicle and driving positions in the second vehicle both selected by the same users, which is required by the ECU 22 to perform estimation. Also, the database 23 stores an estimation likelihood indicating the probability of each of the divided range segments of the driving position in the second vehicle being appropriate (suitable) to the target user.

Next, a description will be given to an estimation process for estimating the optimum divided range segment of the driving position in the second vehicle, which is performed in the data management center 20. The estimation process is performed every time the information on the driving position adjusted by the target user is received from the first vehicle. When the specification of the second vehicle is unknown, the data management center 20 performs the following estimation process for each of a plurality of possible vehicle types, which might be the type of the second vehicle. Otherwise, the following estimation process may also be performed by storing the driving position information from the first vehicle and by identifying the type of the second vehicle at the timing, at which information specifying the type of the second vehicle is transmitted from the target user, or at another timing, at which the target user rides in the second vehicle.

Figure 2:
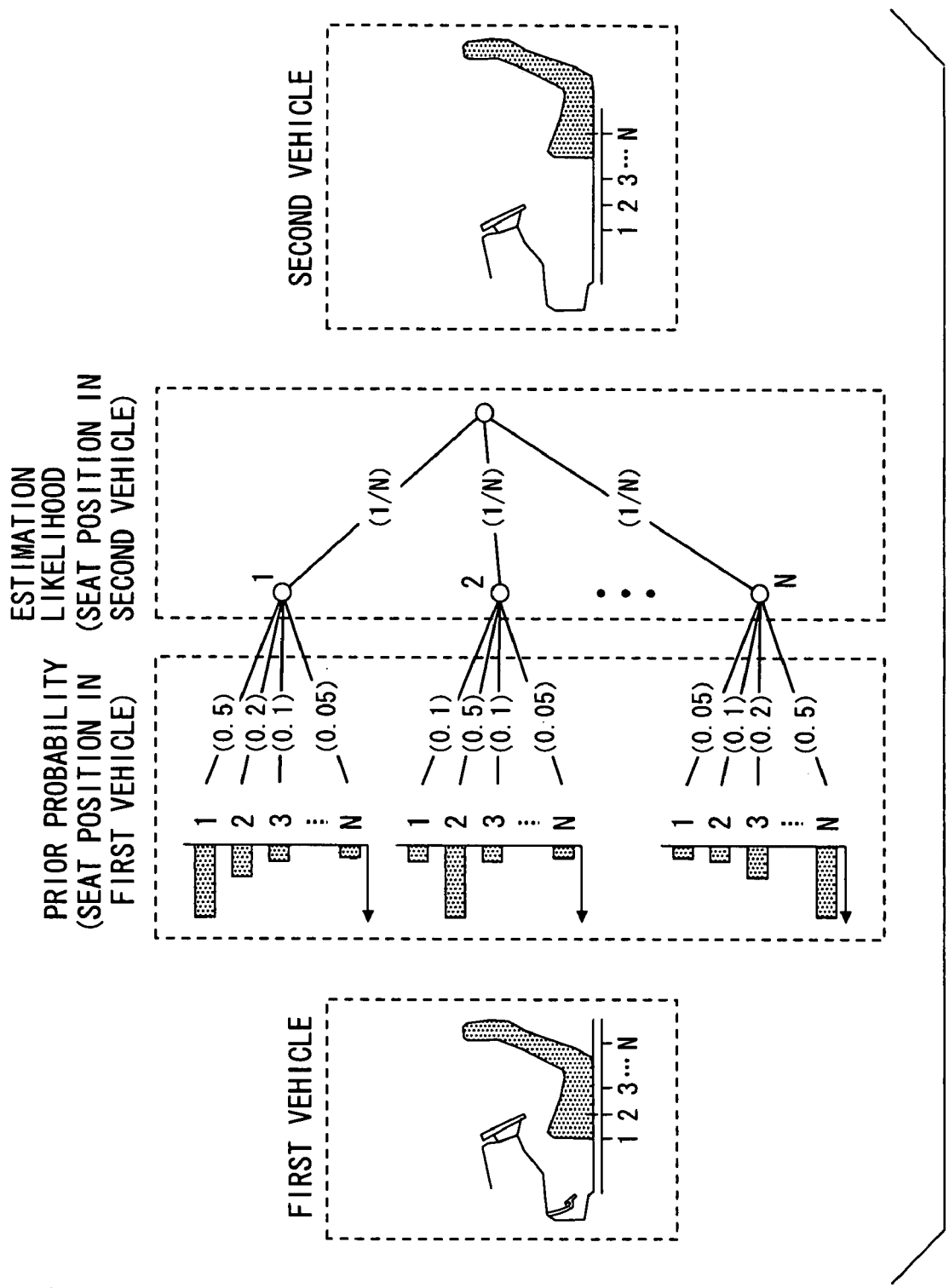
FIG. 2 is an illustrative diagram for illustrating an estimation model that executes an estimation process for estimating an optimum seat fore-and-aft position in a second vehicle based on a seat fore-and-aft position in a first vehicle.

FIG. 2 is a block diagram for illustrating an estimation model when the estimation process is performed in the ECU 22 of the data management center 20. To facilitate understanding of illustration, FIG. 2 shows an example for estimating an optimum fore and aft position of the seat to the target user. The optimum position (e.g., height) and angle of each of the other movable portions of the seat and the steering wheel can be determined by performing an estimation process similar to the estimation process for estimating the optimum seat fore-and-aft position, which will be described below.

The ECU 22 of the data management center 20 performs the estimation process by using Bayesian estimation (inference). In the Bayesian estimation, an estimation model includes (a) the statistic data (prior probability), which is produced from the subject-by-subject relationships between the seat fore-and-aft positions in the first and second vehicles, and (b) the estimation likelihoods, each of which indicates the probability that each of the divided range segments of the seat fore-and-aft position in the second vehicle fits the target user, as shown in FIG. 2. For example, (a) the static data indicates a ratio of users, who select one of the plurality of divided range segments of the adjustable range of the driving position in the second vehicle, and who also select one of the plurality of divided range segments of the adjustable range of the driving position in the first vehicle, relative to users, who select the one of the plurality of divided range segments of the adjustable range of the driving position in the second vehicle. Here, the ratio is one of ratios, each of which is given to a corresponding one of the plurality of divided range segments of the driving position in the first vehicle in association with each of the plurality of divided range segments of the driving position in the second vehicle.

Thus, the statistic data of the present embodiment may be shown in a probability distribution of the divided range segments of the seat fore-and-aft position in the first vehicle for each of the divided range segments of the seat fore-and-aft position in the second vehicle. For example, in other words, the statistic data shows a relation in probability of selection between (a) each of the divided range segments of the seat fore-and-aft position in the first vehicle and (b) each of the divided range segments of the seat fore-and-aft position in the second vehicle.

To set the prior probability and the estimation likelihood each mentioned above, the adjustable range of the seat fore-and-aft position in each of the first vehicle and the second vehicle is divided into a plurality of divided range segments. In the example shown in FIG. 2, it is assumed that the number of the divided range segments is N in each of the first vehicle and the second vehicle.

The above prior probability above shows, as ratio, the relationships between the respective divided range segments of the seat fore-and-aft positions in the first vehicle and the respective divided range segments of the seat fore-and-aft positions in the second vehicle when a plurality of test subjects (users) have selected the seat fore-and-aft positions, which fit them in the first vehicle and the second vehicle. Therefore, in a case, where the target user selects a certain divided range segment of the seat fore-and-aft position (e.g., a certain divided range segment of the adjustable range of the fore-and-aft position of the seat) in the first vehicle, a particular divided range segment of the seat fore-and-aft position in the second vehicle may be most suitable (optimum) for the target user. Here, the particular divided range segment has been selected by the largest number of users among the plurality of users, who have also selected the certain divided range segments in the first vehicle. Accordingly, by using the prior probability, it is possible to estimate the optimum divided range segment of the seat fore-and-aft position in the second vehicle, which fits the target user, based on a selected one of the divided range segments of the seat fore-and-aft position actually selected by the target user in the first vehicle.

The prior probability can be produced in advance by causing the plurality of test subjects to actually ride in the first vehicle and the second vehicle, and by examining the relationship between the respective divided range segments of the seat fore-and-aft positions adjusted by the test subjects at that time. It is also possible to produce the prior probability for the seat fore-and-aft positions in the respective vehicle types (the first vehicle and the second vehicle) based on the received information (e.g., the user ID information, the vehicle type information, the driving position information), which is received by the data management center 20 from each vehicle. This allows the production of the statistic data without extra labor. Specifically, in a case, where the user ID information items for the first and second vehicles match with each other, and the vehicle type information sets of the first and second vehicles are different from each other, the driving position information items thereof can be used as basic data for producing the prior probability of the seat fore-and-aft positions in the different vehicle types. By collecting a plurality of such basic data items, the prior probability can be produced (calculated).

The estimation likelihood given to each of the divided range segments of the seat fore-and-aft position in the second vehicle shows the probability of the divided range segment being optimum (most appropriate) to the target user. By using the estimation likelihood, the divided range segment of the optimum seat fore-and-aft position to the target user can be determined with high accuracy by estimation process customized to the target user. Each estimation likelihood is initially equal to one another (e.g., the estimation likelihood is set to an equal probability for each of the divided range segments of the seat fore-and-aft position). Accordingly, in an initial estimation, the divided range segment of the optimum seat fore-and-aft position in the second vehicle is determined based only on the prior probability.

Figure 3:
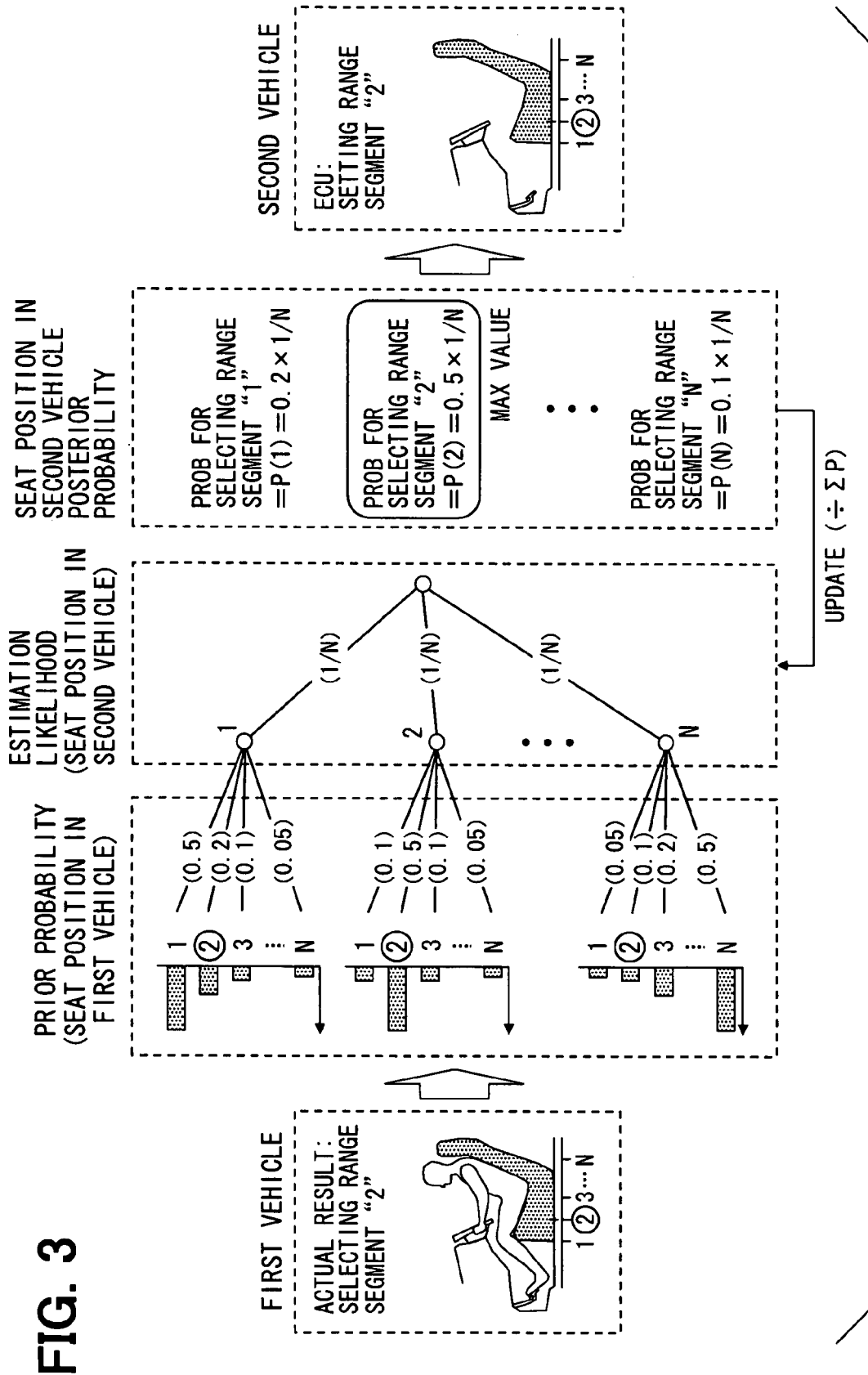
FIG. 3 is an illustrative diagram for illustrating an operation in the estimation model shown in FIG. 2, and an operation of updating estimation likelihoods performed based on the result of the estimation process.

The estimation process by the ECU 22 is performed by applying the selectively adjusted divided range segment of the seat fore-and-aft position in the first vehicle, which has been actually adjusted by the target user, to the estimation model composed of the prior probability and the estimation likelihood. For example, as shown in FIG. 3, it is assumed that the target user has adjusted the driving position and selected the divided range segment "2" of the seat fore-and-aft position in the first vehicle. In response to this, the ECU 22 calculates a product (posterior probability) for each of the plurality of divided range segments "1" to "N" of the seat fore-and-aft position in the second vehicle. Typically, the product is obtained by multiplying (a) each of the ratios (probability) respectively given to the divided range segment "2" selected in the first vehicle in association with each of the divided range segments "1" to "N" of the seat fore-and-aft positions in the second vehicle by (b) each of the estimation likelihoods (1/N) respectively given to the divided range segments "1" to "N" of the seat fore-and-aft position in the second vehicle. Then, the ECU 22 estimates that a divided range segment of the seat fore-and-aft position in the second vehicle corresponding to (having) the largest one of the calculated products (posterior probability) is the optimum divided range segment having the highest probability of being optimum to the target user. In the example shown in FIG. 3, the product (posterior probability) corresponding to the divided range segment "2" of the seat fore-and-aft position in the second vehicle is the largest (maximum value) so that the seat fore-and-aft position in the divided range segment "2" is estimated to be the optimum position.

When such an estimation process for determining the optimum seat fore-and-aft position is performed, the estimation likelihood given to each of the divided range segments "1" to "N" of the seat fore-and-aft position in the second vehicle is simultaneously updated. That is, as shown in FIG. 3, a value, which is obtained by dividing each of the products (posterior probability P) by the total sum (ΣP) of all the products, is designated (updated) as a new estimation likelihood. Here, the product is obtained by multiplying the prior probability by the estimation likelihood, which has been calculated for each of the divided range segments "1" to "N" of the seat fore-and-aft position in the second vehicle. It is to be noted that the division by the total sum ΣP of all the products is made for ensuring that the total sum of the individual estimation likelihoods is 1.

As above, the estimation likelihood, which is given to each of the divided range segments "1" to "N" of the seat fore-and-aft position in the second vehicle, is initially set to an equal probability, and each estimation likelihood is updated every time the estimation process is performed based on the posterior probability P, which is the product between the prior probability and the estimation likelihood. Therefore, the estimation likelihood is more suitably (appropriately) customized to the target user as the experience of the target user riding in the first vehicle increases. As a result, it becomes possible to highly accurately estimate the divided range segment of the seat fore-and-aft position optimum to the user.

Although the description has been given to the preferred embodiment of the present invention, the present invention is not limited to the embodiment described above. The present invention can be variously modified and practiced without departing from the gist thereof.

For example, the embodiment described above comprises the sensor assembly 13 for sensing the driving environment of the vehicle 1. By using the driving environment sensed by the sensor assembly 13, it becomes possible to estimate a driving position more suited to the target user. For example, a range of each driving environment detectable by the sensor assembly 13 (e.g., measurable range of temperature sensed by the temperature sensor 14) is classified into a plurality of groups. Thus, the driving environment sensed by the sensor assembly 13 belongs to (i.e., is classified as) one of the plurality of groups. The optimum divided range segment of the driving position in the second vehicle optimum to the target user is independently estimated for each of the classified groups.

When the target user rides in the second vehicle, the driving environment in the second vehicle is sensed, an optimum divided range segment estimated to be suitable to the group, to which the sensed driving environment belongs, is selected. Then, the driving position in the second vehicle is automatically adjusted to correspond to the selected divided range segment.

The target user may prefer different driving positions for different driving environment. However, as above, it is possible to optimally control the driving position in the second vehicle in accordance with a change in driving environment.

As described above, the sensor assembly 13 includes the temperature sensor 14 for sensing the temperatures inside and outside the vehicle and the internal clock 15 for measuring time. Accordingly, the driving environments classified into the plurality of groups include the temperature outside the vehicle, the temperature inside the vehicle, the hours, during which the vehicle is driven, and the driving duration.

In the embodiment shown above, the description has been given to the example in which the positions and angles of the seat, the head rest, or the steering wheel are adjusted. However, it is also possible to further adjust the angles of mirrors such as a door mirror, a fender mirror, and an interior rear view mirror. This is because such devices as the seat, the steering, and the mirrors are to be adjusted in accordance with the physical features of the target user.

In the embodiment shown above, the description has been given to the example in which the optimum position of the seat of the fore-and-aft position in the second vehicle is estimated based on the adjusted position in the first vehicle. Also, another example, in which similar estimation processes are performed individually for the other adjustment targets, is described. However, it is also possible to set the prior probability and the estimation likelihood in combination of a plurality of adjustment targets such that the optimum divided range segments of the plurality of targets can be simultaneously determined. The above alternative example is shown in FIG. 4.

Figure 4:
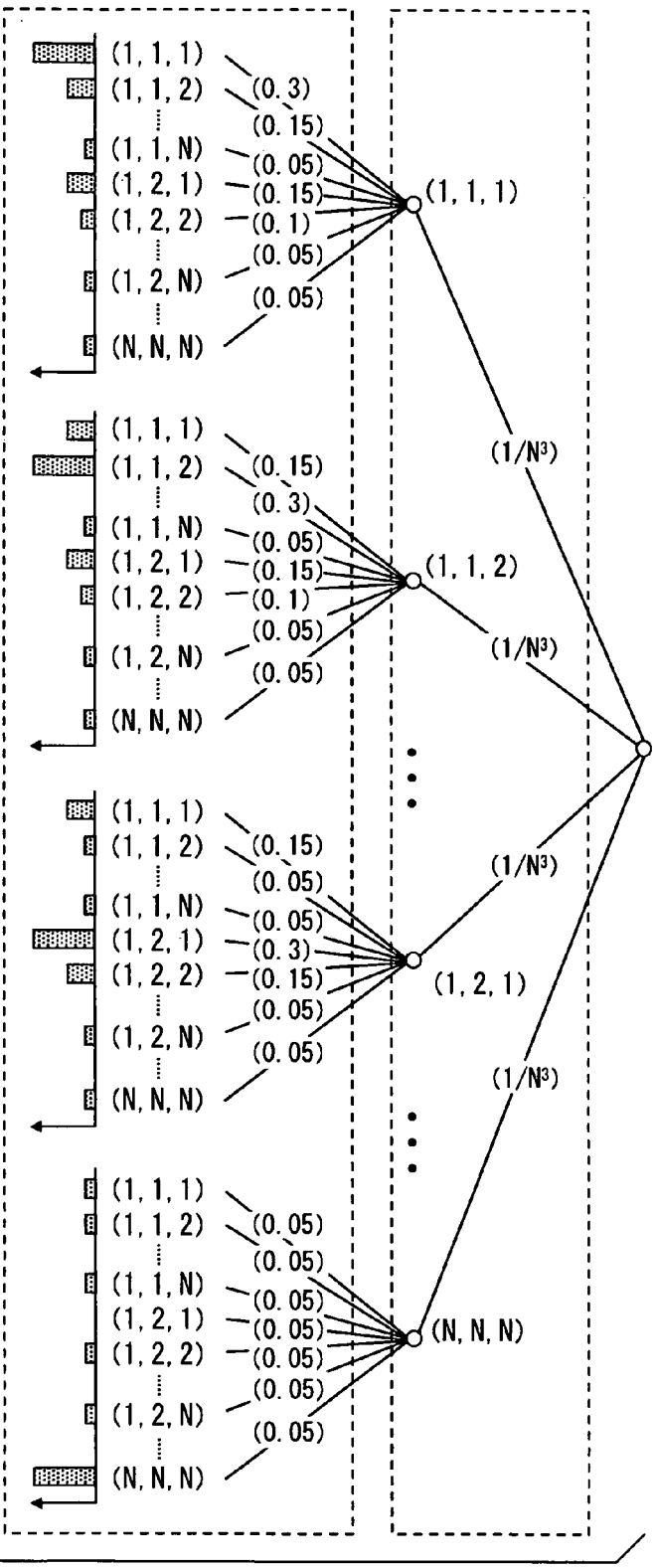
FIG. 4 is an illustrative diagram showing an estimation model according to a modification of the embodiment of the present invention.

The example in FIG. 4 shows a combination of three seat adjustment targets (i.e., the fore-and-aft position of the seat, the reclining angle of the seat back, and the vertical position of the seat surface). Therefore, in a case, where each of the respective numbers of divided range segments of the respective adjustable ranges of the three adjustment targets in the first vehicle and the second vehicle is assumed to be N, the number of variations of the combinations is $N^3$.

In this case, the estimation likelihoods of the seat position in the second vehicle include respective probabilities given to all the combinations (1, 1, 1) to (N, N, N). The prior probabilities include respective probabilities given to all the combinations (1, 1, 1) to (N, N, N) of the seat position of the first vehicle in association with each of all the combinations (1, 1, 1) to (N, N, N) of the seat position in the second vehicle.

In the embodiment described above, the data management center 20 receives the driving position information from the first vehicle, estimates the optimum driving position in the second vehicle based on the received driving position, and transmits the estimation information to the second vehicle. That is, the data management center 20 transmits information between the first vehicle and the second vehicle.

However, it is also possible to estimate the optimum driving position (i.e., the optimum divided range segment of the driving position) in the second vehicle based on the driving position adjusted in the first vehicle, and to transmit the estimated information (e.g., the estimated optimum driving position) to the second vehicle without going through the data management center 20. In this case, the ECU 16 of the vehicle 1 as the first vehicle performs the estimation of the optimum driving position in the second vehicle. Also, the mobile device 30 carried by the target user transmits the estimated information.

A further description will be given to the example. In order that the ECU 16 of the vehicle 1 as the first vehicle performs the above estimation process, it is necessary to store the statistic data (prior probability) showing the relationship between the respective driving positions selected by the same user in the first vehicle and the second vehicle and to store the estimation likelihood showing the probability that each of the divided range segments of the driving position in the second vehicle fits the target user. For this purpose, a memory 17 (storage device), which stores the statistic data (prior probability) and the estimation likelihood, may be provided in the vehicle 1, as indicated by the broken line in FIG. 1 in the present embodiment.

The statistic data (prior probability) stored in the memory 17 may be either produced in advance to be prestored in the memory 17 or may be produced at the above-mentioned data management center 20 based on information received from each vehicle, transmitted to the vehicle 1, and then stored in the memory 17 of the vehicle 1.

The ECU 16 of the vehicle 1 as the first vehicle senses the divided range segment of the driving position of the target user with the various sensors 7 to 11 every time the target user rides in the vehicle 1. Then, the ECU 16 applies the sensed divided range segment of the driving position to the estimation model having the static data (prior probability) and the estimation likelihood, each described above, and arithmetically estimates the divided range segment of the optimum driving position in the second vehicle, while updating the estimation likelihoods. The arithmetically estimated optimum divided range segment of the driving position in the second vehicle and the vehicle type information of the second vehicle, to which the optimum divided range segment of the driving position is applied, are transmitted from the communication unit 12 to the mobile device 30 and held.

When the target user carrying the mobile device 30 rides in the second vehicle, the communication unit 12 of the vehicle 1 as the second vehicle and the mobile device 30 communicate with each other so that the optimum divided range segment of the driving position in the second vehicle, which has been stored in the mobile device 30, is transmitted to the ECU 16 of the second vehicle. At this time, the ECU 16 determines whether or not the divided range segment of the driving position stored in the mobile device 30 is for the vehicle, to which the ECU 16 belongs, based on the vehicle type information stored in the mobile device 30 and the vehicle type information of the second vehicle. When above vehicle type information sets match with each other, the ECU 16 controls a device (e.g., the seat, the steering wheel, the mirror) based on the optimum divided range segment of the driving position.

In the embodiment and variation described above, when the data management center 20 receives the user ID information, the vehicle type information, and the driving position information from each vehicle to produce the above static data (prior probability) from the received information, the statistic data to be produced without extra labor. Also, advantageously, the statistic data may be automatically produced and the updating of the statistic data may be facilitated. However, a certain period of time may be required before practicable statistic data (prior probability) is produced in some cases. In such a case, it is possible to prepare in advance provisional statistic data usable for every combination of vehicle types, and to estimate the divided range segment of a preferred driving position in the second vehicle by using the provisional data until real statistic data (e.g., practicable statistic data) is produced.

The provisional data usable for every combination of vehicle types may be made appropriately such that ratios (prior probabilities) respectively given to the divided range segments of the driving position in the first vehicle for each of the divided range segments of the driving position in the second vehicle have a normal distribution around a corresponding one of the divided range segments of the driving position in the first vehicle.

For example, in the provisional data, for the divided range segment "2" of the driving position in the second vehicle, the provisional ratio (prior probability) is given to each of the divided range segments "1" to "N" in the first vehicle. In this case, the provisional ratios have a normal distribution around the divided range segment "2", which corresponds to the divided rage segment "2" in the second vehicle.

Additional advantages and modifications will readily occur to those skilled in the art. The invention in its broader terms is therefore not limited to the specific details, representative apparatus, and illustrative examples shown and described.

What is claimed is:

1. A driving position adjusting system, which automatically adjusts a driving position in a second vehicle appropriately to a target user based on an adjustment result of a driving position in a first vehicle adjusted by the target user, who rides in the first vehicle, the second vehicle being different in a vehicle model from the first vehicle, the driving position adjusting system comprising:

a storage device for storing statistic data that indicates a ratio of users, who select one of a plurality of divided range segments of an adjustable range of the driving position in the second vehicle, and who select one of a plurality of divided range segments of an adjustable range of the driving position in the first vehicle, relative to users, who select the one of the plurality of divided range segments of the adjustable range of the driving position in the second vehicle, the ratio being one of ratios respectively given to the plurality of divided range segments of the driving position in the first vehicle in association with each of the plurality of divided range segments of the driving position in the second vehicle;

a detection device for detecting a selected one of the plurality of divided range segments of the driving position in the first vehicle, the selected one being selected by the target user when the target user rides in the first vehicle;

an estimation device for estimating an optimum one of the plurality of divided range segments of the driving position in the second vehicle based on the statistic data stored in the storage device and based on the selected one of the plurality of divided range segments detected by the detection device, the optimum one of the plurality of divided range segments having a highest probability of being appropriate to the target user;

a transmission device for transmitting to the second vehicle the optimum one of the plurality of divided range segments of the driving position in the second vehicle estimated by the estimation device; and a control device for controlling the driving position in the second vehicle correspondingly to the optimum one of the plurality of divided range segments transmitted by the transmission device.

2. The driving position adjusting system according to claim 1, wherein:

the storage device stores estimation likelihoods each indicating a probability of each of the plurality of divided range segments of the driving position in the second vehicle being appropriate to the target user;

the estimation device calculates a product for each of the plurality of divided range segments of the driving position in the second vehicle, the product being obtained by multiplying (a) each of the ratios stored and given to the selected one of the plurality of divided range segments of the driving position in the first vehicle in association with each of the plurality of divided range segments of the driving position in the second vehicle by (b) each of the estimation likelihoods respectively given to the plurality of divided range segments of the driving position in the second vehicle, the selected one of the plurality of divided range segments being selected by the target user; and the estimation device estimates a largest one of the plurality of divided range segments of the driving position in the second vehicle as the optimum one, the largest one of the plurality of divided range segments having a largest one of the products calculated by the estimation device.

3. The driving position adjusting system according to claim 2, wherein:

the storage device initially stores an equal estimation likelihood for each of the plurality of divided range segments of the driving position in the second vehicle as the estimation likelihood; and the estimation device updates the estimation likelihoods respectively given to the plurality of divided range segments of the driving position in the second vehicle by using respective products obtained by the respective ratios and the respective estimation likelihoods when the respective products are calculated.

4. The driving position adjusting system according to claim 1, further comprising:

a first driving environment detection device for detecting a driving environment, under which the target user rides in and drives the first vehicle; and a second driving environment detection device for detecting a driving environment, under which the target user rides in and drives the second vehicle, wherein:

the estimation device independently estimates the optimum one of the plurality of divided range segments of the driving position in the second vehicle for each of a plurality of groups, into one of which the driving environment detected by the first driving environment detection device is classified; and the control device selects the optimum one of the plurality of divided range segments estimated for one of the plurality of groups, which the driving environment detected by the second driving environment detection device corresponds to, the control device controlling the driving position in the second vehicle correspondingly to the selected optimum one of the plurality of divided range segments.

5. The driving position adjusting system according to claim 4, wherein:

the first driving environment detection device detects, as the driving environment, at least one of a temperature outside of the first vehicle, a temperature inside the first vehicle, hours, in which the first vehicle is driven, and a driving duration of the first vehicle; and the second driving environment detection device detects, as the driving environment, at least one of a temperature outside of the second vehicle, a temperature inside the second vehicle, hours, in which the second vehicle is driven, and a driving duration of the second vehicle.

6. The driving position adjusting system according to claim 1, wherein the control device controls a plurality of movable portions of a driver's seat as the control of the driving position.

7. The driving position adjusting system according to claim 6, wherein the control device controls a position of a steering wheel as the control of the driving position.

8. The driving position adjusting system according to claim 6, wherein the control device controls an angle of a mirror, which includes one of a door mirror, a fender mirror, and an interior rear view mirror, as the control of the driving position.

9. The driving position adjusting system according to claim 1, wherein:

the storage device and the estimation device are disposed at a data management center;

each of the first vehicle, the second vehicle and the data management center has a communication device for mutual communication with each other; and the transmission device includes the communication device, which is disposed to the second vehicle, and the communication device, which is disposed to the data management center.

10. The driving position adjusting system according to claim 9, wherein:

the data management center collects, from each vehicle, vehicle model information, identity information for identifying the target user, and adjustment result information indicating an adjustment result of a driving position in each vehicle to produce the statistic data; and the data management center stores the statistic data in the storage device.

11. The driving position adjusting system according to claim 10, wherein:

the estimation device of the data management center estimates the optimum one of the plurality of divided range segments of the driving position in the second vehicle by using provisional statistic data by a time, when the statistic data is produced based on the information collected from each vehicle, the provisional statistic data having provisional ratios respectively given to the plurality of divided range segments of the driving position in the first vehicle for each of the plurality of divided range segment of the driving position in the second vehicle, the provisional ratios having a normal distribution around a corresponding one of the plurality of divided range segments of the driving position in the first vehicle.

12. The driving position adjusting system according to claim 1, wherein:

the storage device and the estimation device are disposed to the first vehicle; and the transmission device is adapted to communicate with the first vehicle and the second vehicle, the transmission device storing information that indicates the optimum one of the plurality of divided range segments of the driving position in the second vehicle estimated by the estimation device of the first vehicle, the transmission device sending the stored information that indicates the optimum one of the plurality of divided range segments of the driving position in the second vehicle to the second vehicle when the target user rides in the second vehicle, the transmission device being a mobile device held by the target user.

13. The driving position adjusting system according to claim 12, further comprising data management center, which communicates with the first vehicle and the second vehicle, wherein:

the data management center collects, from each vehicle, vehicle model information, identity information for identifying the target user, and adjustment result information indicating adjustment result of a driving position in each vehicle to produce the statistic data, the data management center transmitting the produced statistic data to the first vehicle; and the first vehicle stores the transmitted statistic data in the storage device.

14. The driving position adjusting system according to claim 13, wherein the estimation device of the first vehicle estimates the optimum one of the plurality of divided range segments of the driving position in the second vehicle by using provisional statistic data by a time, when the statistic data is sent from the data management center and is stored in the storage device, the provisional statistic data having provisional ratios respectively given to the plurality of divided range segments of the driving position in the first vehicle for each of the plurality of divided range segment of the driving position in the second vehicle, the provisional ratios having a normal distribution around a corresponding one of the plurality of divided range segments of the driving position in the first vehicle.

* * * * *